United States Patent [19]

Horton

[11] Patent Number: 4,756,323
[45] Date of Patent: Jul. 12, 1988

[54] RICE RINSER

[76] Inventor: Marilyn Horton, 679 Almond St., Yuba City, Calif. 95991

[21] Appl. No.: 918,894

[22] Filed: Oct. 15, 1986

[51] Int. Cl.[4] ............................................. B08B 3/04
[52] U.S. Cl. .................................... 134/713; 73/426; 134/117; 134/201; 210/244
[58] Field of Search ...................... 134/25.3, 110, 113, 134/117, 155, 201; 68/213; 366/130; 210/244, 415, 464, 469, 474, 475; 73/426; 118/26, 428, 429; 99/285, 295, 306, 323, 536; 422/274, 276

[56] References Cited

U.S. PATENT DOCUMENTS

| | | | |
|---|---|---|---|
| 647,145 | 4/1900 | Meyer | 99/306 X |
| 1,168,027 | 1/1916 | Nirdlinger | 73/426 |
| 1,688,429 | 10/1928 | Murden | 210/415 |
| 1,792,190 | 2/1931 | Dos Santos | 134/110 X |
| 1,806,025 | 5/1931 | Seaman | 422/274 |
| 2,061,119 | 11/1936 | Voigt | 210/474 X |
| 2,120,860 | 6/1938 | Ehlers | 99/306 X |
| 3,510,108 | 5/1970 | Yego, Jr. | 210/474 X |
| 3,595,623 | 7/1971 | Sperti | 422/274 X |
| 4,193,699 | 3/1980 | Haygeman et al. | 134/117 X |

Primary Examiner—Philip R. Coe

[57] ABSTRACT

An apparatus for washing rice prior to cooking includes a glass or plastic cylinder having threadably attached lids at both ends. A screen mesh container is retained within the cylinder and is designed to hold the rice, while the cylinder is partially fillable with water which is used in the rice process. With rice in the container along with water in the cylinder, the apparatus may be shaken to clean the rice. The lid at one end of the cylinder may be removed to exchange or remove the water without a consequent loss of rice, while the opposite lid is removable to permit the removal of the rice from the cylinder. A rice screen sweeper is also provided to remove any rice which sticks to the screen mesh container. Additionally, at least one of the lids includes indentations which permit an exact measuring of the amount of salt to be used.

3 Claims, 1 Drawing Sheet

RICE RINSER

BACKGROUND OF THE INVENTION

1. Field of the Invention

The present invention relates to the kitchen utensils, and more particularly pertains to a utensil which permits the washing of rice prior to a cooking thereof.

2. Description of the Prior Art

As is well known by those who enjoy cooking rice, there is a substantial tendency of rice to cake and stick together in cooking pans. Depending upon the quality and type of rice used, this problem of caking and sticking can be of such magnitude as to result in the production of inedible foodstuffs and damaged cooking utensils. In an effort to overcome the problems of cooking rice, there have been numerous attempts to develop cooking containers which would lessen the likelihood of caking and sticking. However, all of these prior attempts to produce utensils which would result in the preparation of rice that is more fluffy, and less likely to stick and cake, have been substantially unsuccessful. Accordingly, there is a continuing need for new apparatuses and methods for preparing rice which result in a more fluffy rice product, as opposed to being prone to sticking together in lumps, and in this respect, the present invention substantially fulfills this need.

SUMMARY OF THE INVENTION

In view of the foregoing disadvantages inherent in the known types of rice preparation utensils now present in the prior-art, the present invention provides an improved rice preparation utensil wherein the same can be used to wash rice prior to cooking, thereby to result in a more fluffy food product which is less likely to stick and cake. As such, the general purpose of the present invention, which will be described subsequently in greater detail, is to provide a new and improved rice preparation utensil which has all of the advantages of the prior art rice preparation utensils and none of the disadvantages. To attain this, the present invention comprises a glass or plastic cylinder having external threads on its opposed ends, such threads being designed to accept watertight lids as closures. A metal or plastic screen mesh container is positioned within the cylinder and is designed to hold a desired quantity of rice. With both lids attached, water may be retained within the cylinder, whereby a user of the apparatus can effect a shaking of the cylinder to cause a concurrent washing of the rice. One of the lids may be removed to permit an exchange of water without a consequent spilling of the rice contained within the screen container, while the other lid may be removed to permit a removal of the rice from the container. Additionally, a rice screen sweeper is provided within the container and is locatable thereabout to remove excess rice which tends to stick within the screen mesh. Further, at least one of the lids may be provided with one or more measuring indentations, e.g., a measurement of one teaspoon or the like which permits a selective measuring of salt or some other ingredient to be added to the rice.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions so far as they do not depart from the spirit and scope of the present invention.

It is therefore an object of the present invention to provide a new and improved rice preparation utensil which has all of the advantages of the prior art rice preparation utensils and none of the disadvantages.

It is another object of the present invention to provide a new and improved rice preparation utensil which may be easily and efficiently manufactured and marketed.

It is a further object of the present invention to provide a new and improved rice preparation utensil which is of a durable and reliable construction.

Still another object of the present invention is to provide a new and improved rice preparation utensil which permits the cleansing of rice prior to a cooking thereof.

Yet another object of the present invention is to provide a new and improved rice preparation utensil which is susceptible of a low cost of manufacture with regard to both materials and labor, and which accordingly is then susceptible of low prices of sale to the consuming public, thereby making such rice preparation utensil economically available to the buying public.

Still yet another object of the present invention is to provide a new and improved rice preparation utensil which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFFERED EMBODIMENT

Figure 2:
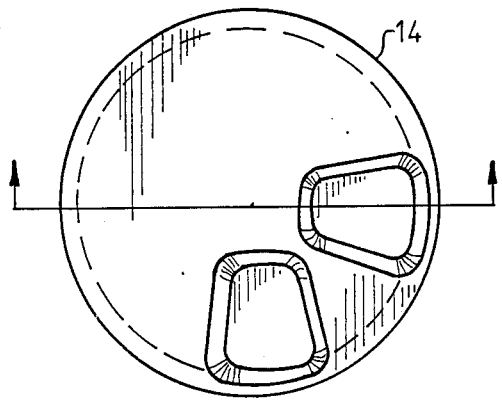
FIG. 2 is a cross sectional view taken along the line 2—2 in FIG. 1.
Figure 3:
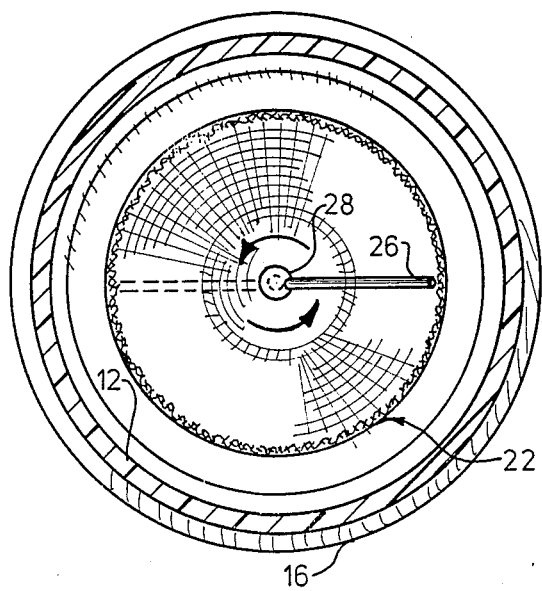
FIG. 3 is a cross-sectional view taken along the line 3—3 in FIG. 1.
Figure 1:
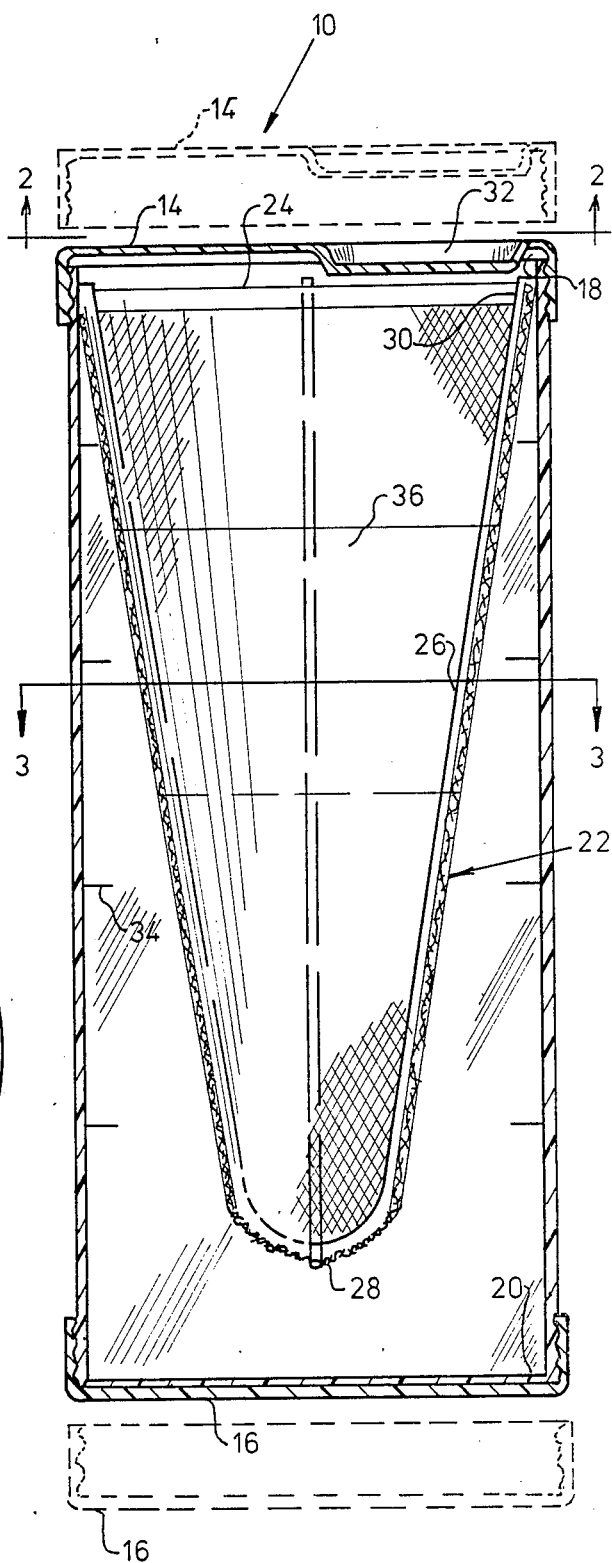
FIG. 1 is a cross-sectional view of the rice preparation utensil comprising the present invention.

With reference now to the drawings, and in particular to FIGS. 1, 2 and 3 thereof, a new and improved rice preparation utensil, hereinafter reffered to as a rice rinser, embodying the principles and concepts of the present invention and generally designated by the reference numeral 10 will be described. More specifically, it will be noted that the rice rinser 10 basically includes a housing 12 which is of a cylindrical shape and which further includes first and second lids 14, 16 threadably attachable to the housing at respective opposed ends thereof. The lid 14 is provided with a peripheral internally positioned, donut-shaped rubber seal 18 which operates to effect a watertight connection between one end of the housing 12 and the lid. Similarly, the lid 16 is provided with an identical rubber seal 20 which operates to provide a watertight seal at the opposed end of housing 12.

The cylindrical housing 12 may be formed from glass or plastic, or some other functional material, and might typically be of a four cup capacity, while the lids 14, 16 could also be formed from plastic, metal, or some similar material. As such, it is within the intent and purview of the present invention to include all known materials which would functionally operate to permit a manufacture and use of the present invention.

With continuing reference to FIGS. 1-3, it will be noted that a mesh or screen container 22 may be positioned within the housing 12 from one end thereof. In this respect, the container 22 may be formed out of any suitable screen mesh material, such as metal or plastic, and is designed to hold a quantity of rice in a manner which will be subsequently described. The container 22 may be desirably cone shaped, although any conceivable shape is within the concept of the present invention, and includes an open end 24 which is of a diameter substantially similar to the internal diameter of the housing 12. Accordingly, the open end 24 may be frictionally engaged by an internal surface of the housing 12, while in a more desired form, some types of receiving grooves for other conventional fastening means may be employed to hold the container in position. The open end 24 of the container 22 will effectively form a seal with the internal surface of the housing 12 to prevent rice from falling out of the container as will be later described.

The screen mesh container 22 further includes a rice screen sweeper 26 which is fixedly, rotatably attached to the container at a pivot point 28, while further being retained in a close abutting relationship with an interior surface of the container by a sliding attachment of the sweeper to the edge of the open end 24. As illustrated, the sweeper 26 may be formed to include a U-shaped portion 30 which is bent around the edge of the open end 24 to effect the desired sliding attachment of the sweeper relative to the interior surface of the container 22.

Additional noteworthy features of the present invention which are best illustrated in FIGS. 1 and 2 include at least one measuring indentation 32 formed in a top surface of at least one of the lids 14. As illustrated, the measuring indentations 32 would typically comprise a one teaspoon measure, whereby these indentations may be used to measure salt, and similiar ingredients, which may be added to the interior of the rice rinser 10 or into a cooking utensil during a use thereof. Also, it will be noted that the interior surface of the rice rinser 10 may include measuring gradations 34 to facilitate measuring the amount of water used in cooking the rice, while the container 22 may include similiar gradations 36 for determining the amount of rice used for cooking.

OPERATION

As to the manner of using the rice rinser 10, reference should be had to FIGS. 1-3 of the drawings. More particularly, it can be seen that a user of the rice rinser 10 need only to remove the lid 14, and then pour one or more cups of water into the housing 12. The water is retained within the housing by the watertight lid 16, and the container 22 which presumably now has a measured amount of rice therein may then be inserted into the housing 12 in the manner illustrated. Of course, the container 22 could be permanently attached to the interior of the housing 12, so that its separability is not an important aspect of the present invention. With the rice and water in the housing 12, the watertight lid 14 may be threadedly attached to the housing, and a user can then proceed to shake the rice rinser to effect a washing of the rice contained therein. If desired, a prescribed amount of salt could be added to the water and rice, preferably through the use of the measuring indentations 32 located on the lid 14.

After a selective amount of shaking has occurred, the lid 16 may be removed from the housing 12 to permit the water to be removed therefrom, while the rice remains captured within the container 22 due to the seal between the top edge 24 and the interior surface of the housing. Additional water may then be poured into the housing 12, and thd lid 16 may then be threadedly reattached, whereby a further washing and rinsing of the rice can be accomplished through a shaking of the rinser. Typically, the water may be changed five or more times until the rice is completely washed, and the rice is then presumably ready for cooking. This prewashing of the rice results in the cooked rice being substantially fluffy with very little tendency to clump or stick. The washed rice may be removed from the container 22 after having been rinsed, with the rice screen sweeper 26 being rotatably about an interior surface of the container to free any rice which remains attached to the screen mesh forming a part of the container.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A rice rinser, comprising:
   a. housing means for receiving a quantity of rinsing liquid, said housing means having a substantially cylindrical shape;
   b. first lid means attachable to a first end of said housing means, said first lid means facilitating a removal of said rice contained within said rice rinser;

c. screen mesh container means for retaining rice within said rice rinser, said screen mesh container means being positionable within and removable from said housing means, said screen mesh container means being sealingly engaged to a peripheral interior surface of said housing means proximate said first lid means, whereby said rice is sealingly retained within said screen mesh container means;

d. second lid means attachable to a second end of said housing means, said second lid means facilitating a removal of said rinsing liquid from said housing means without a concurrent removal of said rice therefrom;

e. rice screen sweeper for removing rice from an interior surface of said screen mesh container, said rice screen sweeper comprising an arm movable along an interior surface of said screen mesh container, said arm being pivotally fixedly attached thereto.

2. The rice rinser of claim 1, wherein said screen mesh container has a substantially conical shape.

3. The rice rinser of claim 1, and further including measuring indentations in at least one of said first and second lid means.

* * * * *